(12) United States Patent
Brown et al.

(10) Patent No.: US 11,973,538 B2
(45) Date of Patent: Apr. 30, 2024

(54) EYE SAFE DIVERGED BEAM OPTICAL WIRELESS COMMUNICATIONS SYSTEM

(71) Applicant: 8 RIVERS CAPITAL, LLC, Durham, NC (US)

(72) Inventors: William J. Brown, Durham, NC (US); Hannah Clark, Durham, NC (US)

(73) Assignee: 8 RIVERS CAPITAL, LLC, Durham, NC (US)

( * ) Notice: Subject to any disclaimer, the term of this patent is extended or adjusted under 35 U.S.C. 154(b) by 0 days.

(21) Appl. No.: 17/760,677

(22) PCT Filed: Sep. 17, 2020

(86) PCT No.: PCT/IB2020/058684
§ 371 (c)(1),
(2) Date: Mar. 15, 2022

(87) PCT Pub. No.: WO2021/053583
PCT Pub. Date: Mar. 25, 2021

(65) Prior Publication Data
US 2022/0393769 A1 Dec. 8, 2022

Related U.S. Application Data (60) Provisional application No. 62/901,391, filed on Sep. 17, 2019.

(51) Int. Cl.
*H04B 10/50* (2013.01)
*G02B 5/02* (2006.01)
*G02B 19/00* (2006.01)
*H04B 10/11* (2013.01)

(52) U.S. Cl.
CPC ............. *H04B 10/503* (2013.01); *G02B 5/02* (2013.01); *G02B 19/0047* (2013.01); *G02B 19/009* (2013.01); *H04B 10/11* (2013.01)

(58) Field of Classification Search
None
See application file for complete search history.

(56) References Cited

U.S. PATENT DOCUMENTS

| 6,490,067 | B2 * | 12/2002 | Bloom | H04B 10/1125 398/128 |
| 9,755,739 | B1 * | 9/2017 | Wang | H04B 10/118 |
| 2004/0120718 | A1 * | 6/2004 | Verbana | H04B 10/1121 398/119 |
| 2007/0109784 | A1 | 5/2007 | Kosnik | |
| 2011/0274434 | A1 * | 11/2011 | Cunningham | H04B 10/112 398/118 |

(Continued)

FOREIGN PATENT DOCUMENTS

| EP | 1411653 | 4/2004 |
| WO | WO 99/24856 | 5/1999 |

*Primary Examiner* — David W Lambert
(74) *Attorney, Agent, or Firm* — Womble Bond Dickinson (US) LLP (57) ABSTRACT

A diverged beam optical transmitter is provided that includes a laser source configured to emit a light beam, and one or more lenses. The diverged beam optical transmitter also includes a diffuser placed between the laser source and the one or more lenses, and configured to increase an intrinsic divergence of the light beam and to fill some portion of the one or more lenses such that the light beam is eye safe after the one or more lenses.

17 Claims, 7 Drawing Sheets

(56) References Cited

U.S. PATENT DOCUMENTS

| | | | |
|---|---|---|---|
| 2012/0206922 A1* | 8/2012 | Feklistov | G02B 27/0927 362/311.12 |
| 2013/0223846 A1* | 8/2013 | Joseph | H01S 5/005 398/118 |
| 2014/0248048 A1* | 9/2014 | Northcott | H04B 10/1125 398/25 |
| 2018/0196139 A1* | 7/2018 | Brown | G01S 17/10 |

* cited by examiner

EYE SAFE DIVERGED BEAM OPTICAL WIRELESS COMMUNICATIONS SYSTEM

CROSS-REFERENCE TO RELATED APPLICATIONS

The present application is a U.S. National Phase of International Application PCT/IB2020/058684, filed Sep. 17, 2020, which claims priority to U.S. Provisional Patent Application No. 62/901,391, entitled: Eye Safe Diverged Beam Optical Wireless Communications System, filed on Sep. 17, 2019, the content of which are incorporated herein by reference, in their entirety.

TECHNOLOGICAL FIELD

The present disclosure relates generally to optical wireless communication and, in particular, to eye safe diverged beam optical wireless communication.

BACKGROUND

The concept of free space optical (FSO) communications using lasers dates back to the invention of the laser. However, difficulties with generating and modulating high-power lasers have restricted the use of FSO to line-of-sight systems using tightly-collimated beams. Very low-power and low-modulation-rate with diverged pulses of light has been used in a few niche applications such as remote controls for televisions and other appliances. Even during the telecom boom of the late 1990's and early 2000's when billions of dollars of investment was made in components and systems, FSO systems did not reach beyond collimated beams in line-of-sight configurations. There are several existing companies selling FSO line-of-sight systems, but these systems require precise alignment and skilled installation. These systems costs start around US $10,000 per link, and only a few thousand systems are shipped per year.

A recently-developed FSO communication system that that takes into account and resolves at least some of the issues discussed above, as well as possibly other issues, is described in U.S. Pat. No. 9,847,834, which is incorporated herein by reference. It is nonetheless often desirable to further improve on and extend existing systems and methods.

BRIEF SUMMARY

Example implementations build on the diverged beam free space optical links described in the '834 patent, as well as other related filings including U.S. Patent Application Publication No. 2017/0257167 to Adams et al., and U.S. Patent Application Publication No. 2018/0196139 to Brown et al., the content of both of which are also incorporated herein by reference. Example implementations of the present disclosure add a diffuser between the laser and the transmit lens in a diverged beam system. In particular, example implementations provide a high power laser (or array) with a diffuser and lens configured to increase the angular range of the emitted laser beam as perceived by the human eye and increase the illuminated area of the exit aperture, thus maximizing the amount of light that can be transmitted while remaining eye safe.

The diffuser divergence and laser spot size offer at least two advantages:
1. The diffuser increases the beam divergence so that the laser beam nearly fills the transmit lens. This increases the illuminated area at the exit aperture, allowing higher total transmitted power.
2. The intrinsic beam divergence (referred to as alpha—$\alpha$) is now set by the laser spot size on the diffuser divided by the distance between the diffuser and the transmit lens. Larger values of a have larger eye safe intensity limits.

The spot illuminated on the diffuser by the laser becomes the effective area for the beam divergence, with the diffuser filling an optic fully or nearly so, with light, increasing the acceptable intensity by 50 times in certain arrangements and total output power by 100 times or more.

The intrinsic divergence and the overall divergence can be independently controlled with the requirement that the overall divergence is larger than the intrinsic divergence.

Example implementations of the present disclosure include a number of differences over the prior art. For example, Wick (U.S. Pat. No. 4,453,806) teaches and claims a collimated laser beam that goes through a transmissive optical element (or off of a reflective optical element), through a transmissive diffuser and finally through a collimating optic. The notable differences include that example implementations of the present disclosure (1) use a diverging laser array, (2) eliminate the first optic element, and (3) end up with a diverging beam instead of a collimated one.

Lopez-Hernandez (U.S. Pat. No. 6,867,929) teaches and claims a laser light source, a diffuser, a collimator AND an optical focusing system arranged to focus laser light onto diffuser where all three optics formed from one piece. This is different than our approach of using laser divergence with degree of diffusion set by a diffuser and then a lens to change beam divergence.

Joseph (U.S. Patent Application Publication No. 2013/0223846) teaches short range (few meters) connections between circuit boards. His teachings include using sections of a vertical-cavity surface-emitting laser (VCSEL) array to achieve multi-level amplitude modulation but also selectively using sections of a subset of the array to achieve some amount of beam steering. Finally, by selecting a subset of the array he also claims to achieve optical switching. Furthermore, by using multiple detectors on the receive side and subsections of the array on the transmit side he teaches the use of MIMO (multiple input-multiple output) techniques that are standards in optical communication systems. In this patent, the diffuser is used to make laser array look like an extended source and to mix elements so that the beam is incoherent. However, similarly to Wick, the output beam after the lens is still collimated which is physically impossible for an extended source such as the one he teaches.

Chan et al. (U.S. Pat. No. 6,504,634) describes using a diffuser with a small amount of intrinsic scattering (~1°) to increase the beam divergence up to a maximum of 1.5 mrad. For eye safety considerations, this is still a collimated beam. They teach this as an upper limit while example implementations use intrinsic divergences well above this value for higher power applications. Because of their limited beam divergence, these teachings would be limited to lower powers as the beam is still considered nearly collimated in eye-safety parameters.

Chacko and Davies (published paper, INTERNATIONAL JOURNAL FOR TRENDS IN ENGINEERING & TECHNOLOGY, VOLUME 5 ISSUE 2—May 2015—ISSN: 2349-9303)—describe a visible light system using LEDs with lenses and then diffusers. The links they describe here are very short (a few meters) and can thus have a high degree of divergence or low power levels to reach such minimal distances. When larger distances are needed it becomes imperative and non-obvious how to remain eye-safe without sacrificing optical power or narrowing the divergence too much.

O'Brien and Katz (website, Wireless World Research Forum (WWRF) ~2004) mentions using diffusers in FSO links to increase allowed power. They do not give any details; rather, they give a general overall view of FSO for various applications.

Khoo et al. (IEEE Colloquium Optical Wireless Communications, 1999 page 3) uses a collimating lens followed by a diffuser. The spacing between the laser and lens sets the spot size and then the engineered diffuser sets the divergence. The paper describes very short range optical lengths, approximately 2 meters in length. The concept could be scaled to larger powers but has several disadvantages relative to example implementations of the present disclosure. The most important disadvantage is that the engineered diffuser described in the paper would make small divergence beams difficult or impossible to achieve. They describe a 14-degree total divergence. Some example implementations of the present disclosure use 2-degree total divergence but have the ability to diffuse to even smaller angles. The diffusers that have been identified in the prior art do not enable collimated beams with 1 to 2-degree divergence or less.

A second disadvantage of Khoo is that, due to the setup, the overall beam divergence, and the intrinsic divergence ($\alpha$) are the same value and controlled by the diffuser. In example implementations of the present disclosure, example implementations of the present disclosure include a setup where the beam divergence and the intrinsic divergence may be independently and separately controlled. One advantage is that the size of the setup and the overall footprint is flexible since one can independently control the two divergences. This is also advantageous for flexibility in applications where one may need to optimize one at the cost of the other.

Additionally, the overall size of the system is larger in Khoo's teachings. The distance between the laser and lens is set by the natural divergence of the laser, so it must be farther away to achieve the same spot size on the lens as obtained with example implementations of the present disclosure. The diffuser is then after the lens, further increasing the size. As an example, our 1 Gbps link has an output optical power of 1 W and a 2-degree divergence. In order to be eye-safe, the spot needs to fill a 2-inch diameter area. To achieve this with the source—lens—diffuser setup requires twice the path length compared to our source—diffuser—lens setup.

Kare et al. (U.S. Patent Application Publication No. 2018/0131450) propose a high power beam arrangement based on VCSELs, optics and photodiodes. In this work, a diffusion device is set between the VCSEL and the lens, however, there is no mention of the intrinsic divergence from the finite extent of the source and it is assumed to be zero in their discussion, which is unphysical. Furthermore, the degree of divergence is assumed to be completely controllable, which is also unphysical due to the finite extent of sources. While their argument may work for a theoretical textbook point source, it is not feasible with physical sources that have a finite, non-zero source extent. Moreover, one of their statements is a violation of the 2nd law of thermodynamics. On page 18 line 27, they state "will increase the radiance"—radiance, like etendue, cannot be increased in any passive system as it is a violation of the 2nd law of thermodynamics.

Their statements on eye-safety and what determines eye safety are also only partially correct. On page 19, line 14, they state "Filling the determined projection aperture in this way increases the apparent angular size of the high-flux power beam 106, which reduces the eye hazard associated with the high-flux power beam 106, and increases safety per certain U.S. and International laser safety standards." However, they are incorrect when they state that filling the aperture reduces the eye hazard. Increasing the intrinsic beam divergence is what decreases the eye hazard. This is discussed in our disclosure. They ignore intrinsic divergence and assume intrinsic divergence can be reduced back to zero, when, in fact, intrinsic divergence cannot be reduced at all. Furthermore, filling the aperture increases does increase the total allowed power throughput, because eye safety is set in $mW/cm^2$ so increasing the area increases the total power throughput.

The present disclosure thus includes, without limitation, the following example implementations.

Some example implementations provide a diverged beam optical transmitter comprising a laser source configured to emit a light beam; one or more lenses; and a diffuser placed between the laser source and the one or more lenses, and configured to increase an intrinsic divergence of the light beam and to fill some portion of the one or more lenses such that the light beam is eye safe after the one or more lenses.

In some example implementations of the diverged beam optical transmitter of any preceding example implementation, or any combination of any preceding example implementations, the intrinsic divergence of the light beam has different values in different directions.

In some example implementations of the diverged beam optical transmitter of any preceding example implementation, or any combination of any preceding example implementations, the laser source includes a vertical-cavity surface-emitting laser array.

In some example implementations of the diverged beam optical transmitter of any preceding example implementation, or any combination of any preceding example implementations, the laser source includes a fiber coupled laser that is amplified by an erbium doped fiber amplifier and then connected to the diverged beam optical transmitter by another fiber.

In some example implementations of the diverged beam optical transmitter of any preceding example implementation, or any combination of any preceding example implementations, the diffuser is a transmission diffuser.

In some example implementations of the diverged beam optical transmitter of any preceding example implementation, or any combination of any preceding example implementations, the diffuser is configured to be translated closer to or farther from the laser source to change the intrinsic divergence.

In some example implementations of the diverged beam optical transmitter of any preceding example implementation, or any combination of any preceding example implementations, the diffuser is configured to be translated closer to the laser source to increase the intrinsic divergence during link acquisition, and then farther from the laser source to decrease the intrinsic divergence and increase a rate of data transmission.

In some example implementations of the diverged beam optical transmitter of any preceding example implementation, or any combination of any preceding example implementations, the transmission diffuser is an engineered diffuser.

In some example implementations of the diverged beam optical transmitter of any preceding example implementation, or any combination of any preceding example implementations, the diffuser is an active element configured to change a degree of diffusion in response to an input.

In some example implementations of the diverged beam optical transmitter of any preceding example implementation, or any combination of any preceding example implementations, the active element is a mechanically movable element.

In some example implementations of the diverged beam optical transmitter of any preceding example implementation, or any combination of any preceding example implementations, the mechanically movable element substantially prevents transmission of light in its resting position.

In some example implementations of the diverged beam optical transmitter of any preceding example implementation, or any combination of any preceding example implementations, the diverged beam optical transmitter further comprises an additional passive diffuser between the active diffuser and the one or more lenses.

In some example implementations of the diverged beam optical transmitter of any preceding example implementation, or any combination of any preceding example implementations, the diverged beam optical transmitter is eye safe per Class 1.

In some example implementations of the diverged beam optical transmitter of any preceding example implementation, or any combination of any preceding example implementations, the diverged beam optical transmitter is eye safe per Class 1M.

Some example implementations provide a diverged beam optical communications system comprising a laser source configured to emit a light beam; one or more lenses configured to collimate the light beam to an overall divergence of the light beam; a diffuser configured to increase an intrinsic divergence of the light beam and to fill some portion of the one or more lenses such that the light beam is eye safe after the one or more lenses; a receive lens; and a detector, the receive lens configured to focus the light beam onto the detector, and the detector with an etendue sufficient to receive light from the receive lens with an acceptance angle larger than 1.7 mrad.

Some example implementations provide a diverged beam optical communications system comprising a laser source configured to emit a light beam; one or more lenses configured to collimate the light beam to an overall divergence of the light beam; a diffuser configured to increase an intrinsic divergence of the light beam and to fill some portion of the one or more lenses such that the light beam is eye safe after the one or more lenses; a receive lens; and a detector, the receive lens configured to focus the light beam onto the detector, and the detector with a etendue sufficient to receive light from the receive lens with an acceptance angle larger than 5 mrad.

Some example implementations provide a diverged beam optical communications system comprising a laser source configured to emit a light beam; one or more lenses configured to collimate the light beam to an overall divergence of the light beam; a diffuser configured to increase an intrinsic divergence of the light beam and to fill some portion of the one or more lenses such that the light beam is eye safe after the one or more lenses; a receive lens; and a detector, the receive lens configured to focus the light beam onto the detector, and the detector with a etendue sufficient to receive the light beam from the receive lens with an acceptance angle larger than 17 mrad.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably.

Laser eye safety. There are several physical mechanisms by which lasers can damage the human eyes. Very short, high intensity pulses can cause both denaturation of proteins and explosive boiling of water in the eye. Longer exposure times can lead to photochemical damage where light triggers chemicals reactions in the tissue.

The wavelength of the light determines the impact on the human eye. Visible light will typically induce a blink reaction and hence higher optical powers are considered eye safe. At longer wavelengths, the water inside the eye will absorb much of the light, preventing it from ever reaching the retina. As an example, at 1550 nm light the eye safe limit is set by the point where the light will burn the cornea, and has a value of ~100 mW/cm². In the case of a 50 mm diameter lens, the maximum launch power is ~2 W. In between is a range of wavelengths that can still pass through the water in the eye, but the retina response is much lower and so the beam will appear to the eye to be much dimmer than it actually is. In this range, the eye safe power limit is lower.

The intrinsic divergence of the light beam (typically referred to as alpha—$\alpha$—and given in units of milliradians) also determines the impact on the eye. Any beam with an $\alpha$<1.5 milliradians is considered collimated for eye safety, since the lens in the eye is can only focus to a minimum spot size of about 20 microns at the retina. Beams with $\alpha$>1.5 milliradians will focus to a spot that is larger than 20 microns and can have higher intensities without causing eye damage. Note that the intrinsic beam divergence is different than the overall beam divergence. A laser exiting from a single mode fiber may cover a range of many 10's of degrees (the overall beam divergence), but the intrinsic divergence ($\alpha$) is still less than 1.5 milliradians because the emission area set by the fiber is very small (5 to 10 microns).

Figure 1:
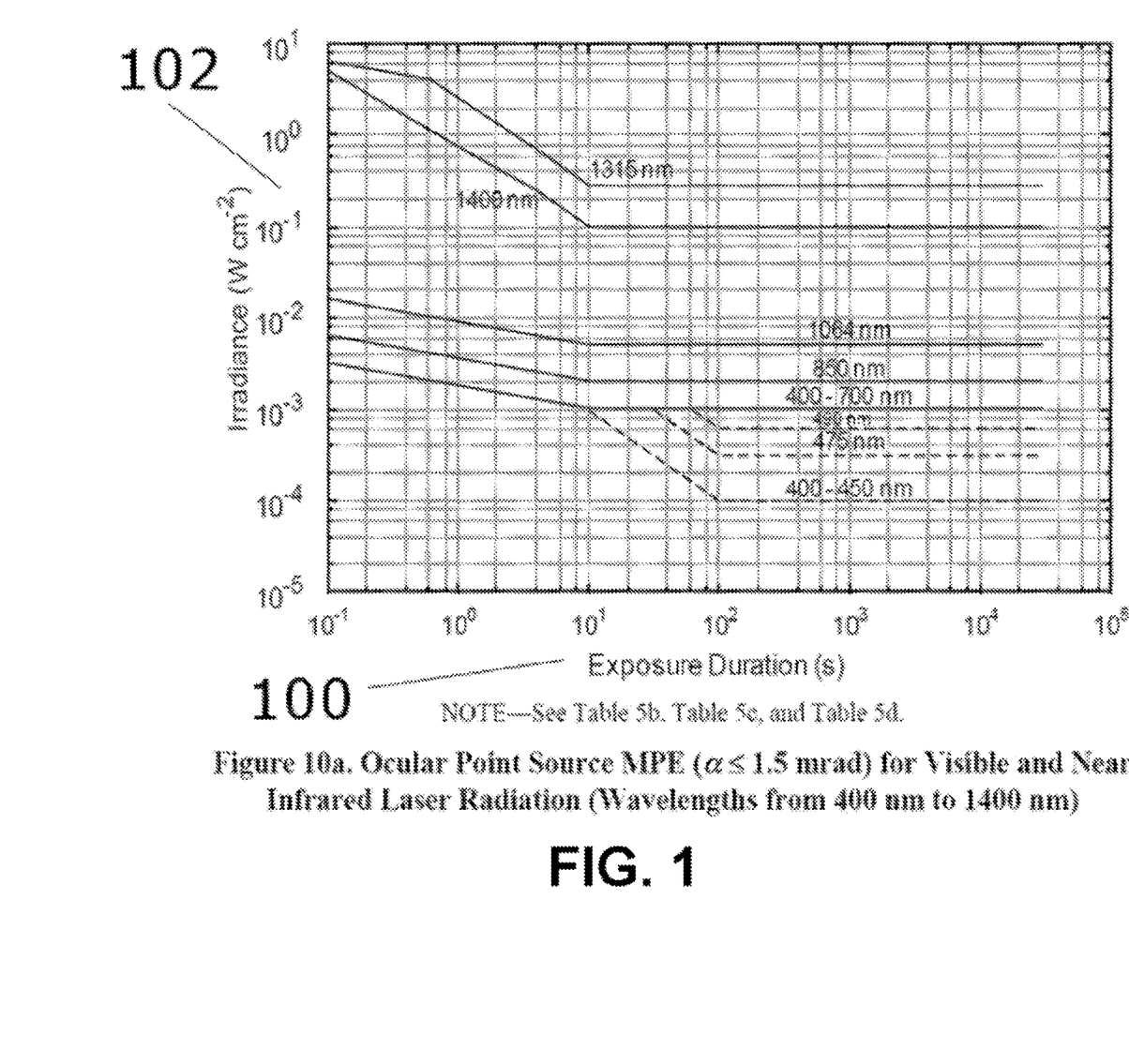
FIG. 1 shows maximum permissible exposure for a collimated beam for certain wavelengths and exposure durations, according to some example implementations of the present disclosure.

FIG. 1 shows the MPE (maximum permissible exposure, American National Standard Z136.1-2014 page 104) for a collimated beam ($\alpha$<1.5 mrad) for wavelengths ranging from 400 nm to 1400 nm and exposure durations from 0.1 second to ~30,000 seconds (8 hours). The irradiance measured in Watts per cm² is plotted on the y-axis 102 against the exposure time on the x-axis 100. Longer wavelengths generally have higher MPE's with the exception that 1400 nm is below 1315 nm. The MPE generally plateaus after 10 seconds.

If the beam comes from an extended source, such as a light bulb, then a is much larger than 1.5 milliradians and the eye does not focus the light to the minimum spot, but rather to a larger spot. This larger spot can have a larger total power without damaging the retina. Subsequently, the intensity in the beam incident on the eye can be higher.

Figure 2:
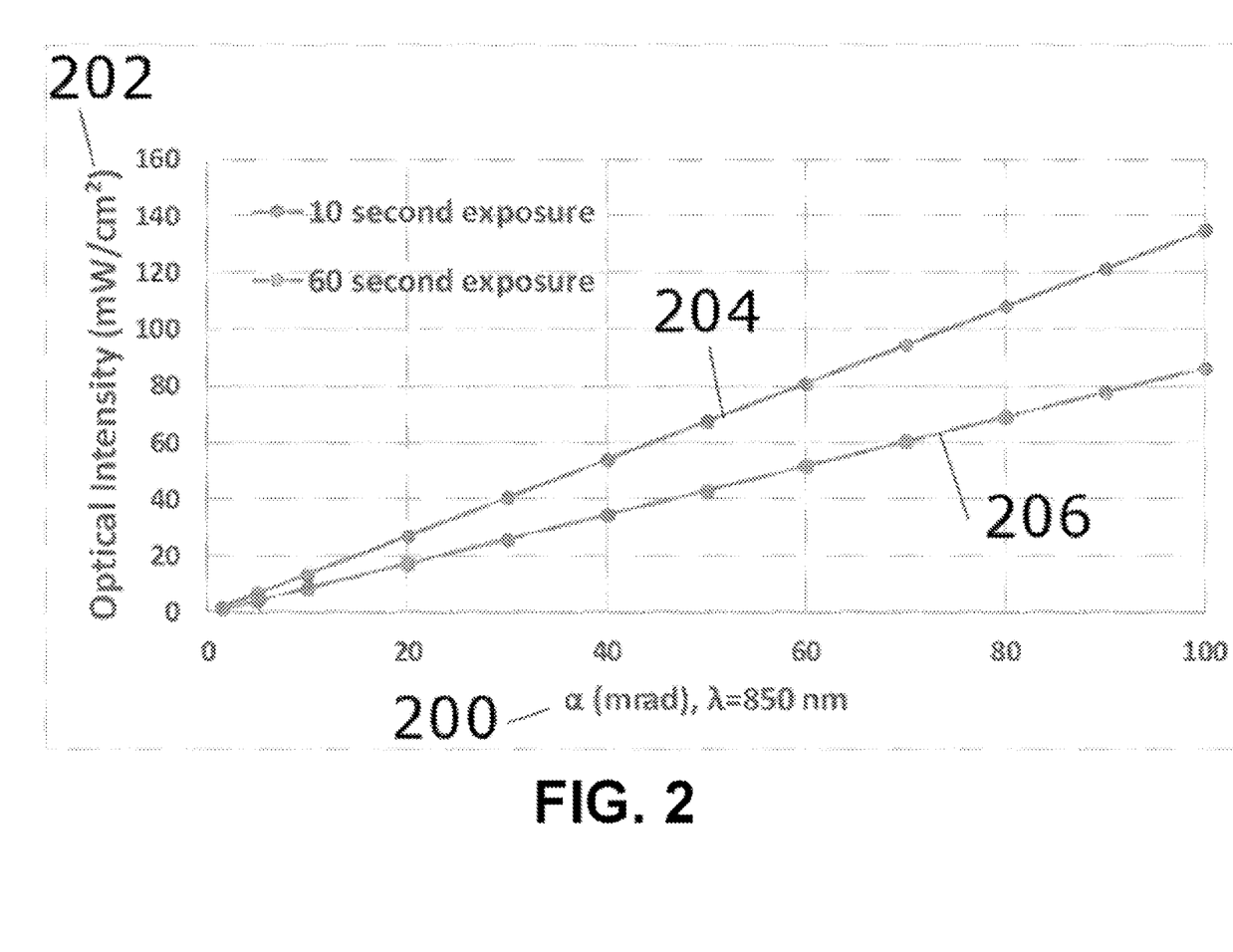
FIG. 2 shows a plot of eye safe optical intensity for a particular range of values of a, according to some example implementations.

FIG. 2 shows a plot of the eye safe optical intensity 202 (in mW/cm²) for the range of values of a 200 from 1.5 mrad up to 100 mrad. This plot is calculated at a wavelength of 850 nm and an exposure time of 10 seconds 204 and 60 seconds 206. The upper level of 100 mrad (~6°) is the point at which the total power on the retina becomes a concern.

Eye safety is used herein as defined by laser safety standards such as the American National Standards Institute (ANSI) Z136.1 standard (the ANSI Z136.1 standard), the International Electrotechnical Commission (IEC) 60825-1 standard (the IEC-60825-1 standard), and the like. Eye safety is set by class with different safety rules for each class. Current classes include Class 1, Class 1M, Class 2, Class 2M, Class 3R, Class 3B, and Class 4. Different example implementations will be eye safe for different classes. Many example implementations will be Class 1 or Class 1M. Some example implementations will be Class 2 or Class 2M. Some example implementations may be Class 3R, Class 3B, or Class 4.

Previous FSO systems. Most FSO communications systems have used either a fiber-coupled laser or a single element laser diode. These light sources have a natural angular range of emission, which is then collimated into a beam by using one or more lenses or mirrors. There is still a residual divergence that is set by the diameter of the emission area relative to the focal length of the collimated lens, or in the extreme case of a very small emission area, by the ratio of the spot size on the lens to the wavelength of light. This divergence can be quite small, less than 1 microradian in the case of a single mode fiber and a 50 millimeter collimation lens. For all of these systems, $\alpha$ is <1.5 milliradians and the minimum eye safety intensity applies.

As an example, at 850 nm, light passes through the water in the eye and so the limit is low, ~2 mW/cm² for a collimated beam. The maximum power output for a 50 mm diameter lens is now limited to about 40 mW of total optical power. This total power in the beam limits the link distance of the FSO system.

To increase this limit, many FSO systems used 1310 nm wavelength lasers. In this case the light does not pass through the water in the eye and the eye safety threshold is set by the power level that will cause burns on the cornea. This is around 200 mW/cm2; now a 50 mm diameter lens can launch almost 4 W. However, as noted in previous applications, 850 nm is sometimes preferred since silicon based components can be used, which are currently much cheaper than materials such as InGaAs that are used for longer wavelength devices.

Advantage of DBFSO links. Example implementations of the present disclosure add a diffuser between the laser and the lens so that the beam nearly fills the lens and the intrinsic beam divergence is up to, but does not exceed the overall beam divergence. This increases the maximum launch power and hence the maximum distance and data rate that the link can achieve.

Figure 3A:
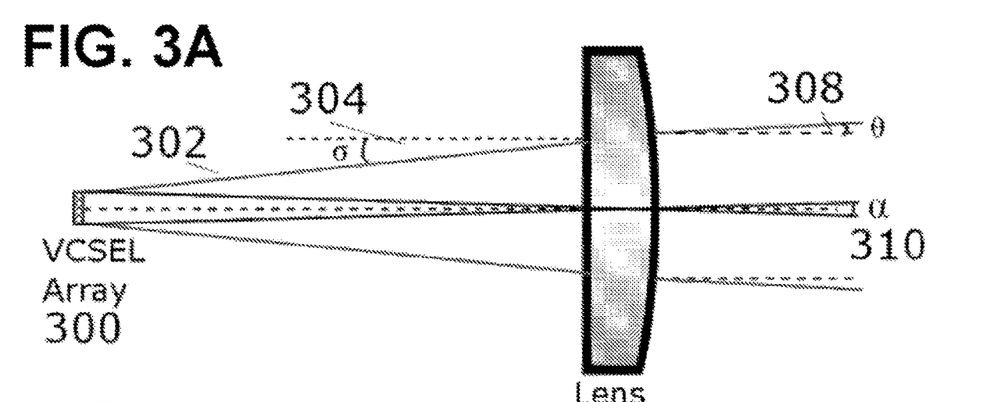
FIG. 3A shows diverged beam optical transmitter without a diffuser.

In previous disclosures and filings, a diverged beam system has been described where the source consists of a laser or laser array with one or more lenses for setting the system degree of divergence. If the lens(es) is set at a focal length from the laser, then the overall divergence of the beam is set by the size of the laser area relative to focal length of the lens, i.e., the minimum divergence is given by (laser array size)/(lens focal length). FIG. 3A shows this configuration. The laser array 300 has a finite width and the laser beam 302 diverges at the natural divergence angle of the laser or laser array 300. The beam makes an angle σ 304 with the focusing lens 306 and then has a different divergence angle θ 308 with the normal. The finite extent of laser on the other side of the lens is given by α 310.

In general, the system beam divergence can be increased by moving the lens closer to the laser. Even though the overall beam divergence will then increase, the localized (or intrinsic) divergence will still be set by the laser size divided by the distance to the lens. This holds until the lens gets close enough to the laser that it is limited by the laser beam divergence. At this point the overall divergence is set by the divergence of the laser itself, that is the lens starts to look like a window with little or no focusing power.

Many lasers and laser arrays have a divergence in the range of 20° to 40°, and in one implementation the divergence is between 24° and 34°. Each of the individual laser elements could be collimated by a lens, however since the elements are at different lateral points relative to the lens axis, each beam will be collimated in a different angular direction. The laser elements are also very close together, within tens of microns, so building an array of lenses where there is a lens for one or a few laser elements may be difficult.

Diverged beam without diffuser. FIG. 3A provides an example implementation of the higher power allowed with a diverged beam system without a diffuser. In one case suppose the laser 300 is ~1 mm across and the lens 306 is ~40 mm away. The divergence for eye safety is then ~25 milliradians, which increases the acceptable intensity from 2 mW/cm$^2$ to 34 mW/cm$^2$ (for 10 second exposure). The spot size at the lens is only 2.1 cm across, so the maximum system launch power is 118 mW.

Diverged beam with diffuser. Example implementations of the present disclosure increase the acceptable intensity by adding a diffuser between the laser(s) and the lens(es). The diffuser scatters the light over a controlled range of angles. This range of angles will always be larger than the beam divergence from the laser itself, otherwise the system would violate conservation of etendue and the 2nd law of thermodynamics. The spot illuminated on the diffuser by the laser becomes the effective area of the laser for the intrinsic beam divergence as the laser propagates through the rest of the transmitter and then system.

The area illuminated on the transmit lens is then set by the diffuser output angle and the distance between the diffuser and the transmit lens. The goal is to fill as much of the transmit lens as possible while still maintaining a large enough value for α. The longer the distance between the diffuser and the lens(es), the larger the beam size at the lens, but longer distances mean smaller values of α.

Figure 3B:
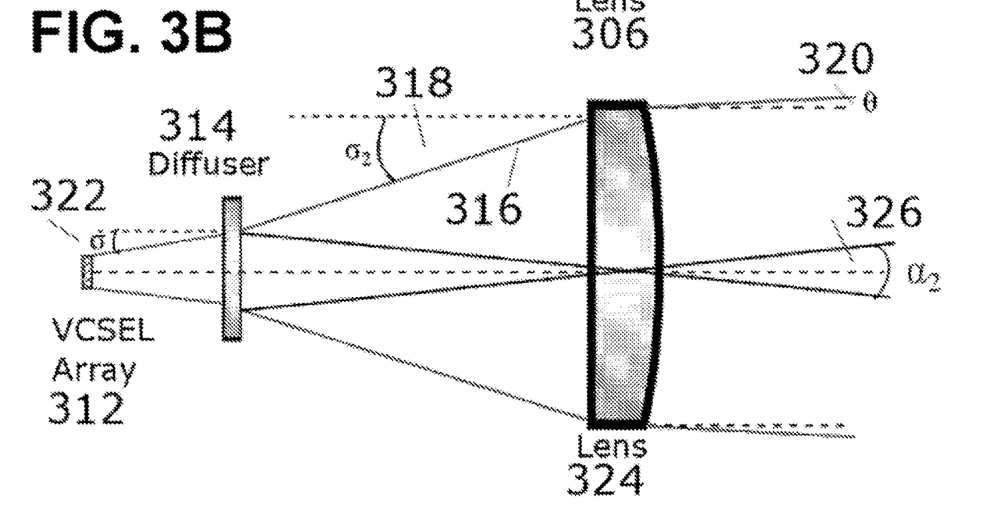
FIG. 3B shows diverged beam optical transmitter with a diffuser, according to some example implementations.

FIG. 3B shows an example implementation. The laser array 312 has a natural divergence and makes an angle σ 322 with the diffuser 314. The beam from the diffuser 316 is at a different divergence angle and makes an angle 62 with respect to the lens 324. The lens 324 changes the divergence of the beam again so that it makes an angle θ with respect to the normal. The area illuminated on the transmit lens 324 makes an angle $\alpha_2$ 326 behind the lens 324. This value of α is larger than in FIG. 3A due to the diffuser.

As an example implementation of the present disclosure, a 3 mm spot on the diffuser that is 40 mm from the lens gives a divergence of 75 milliradians and an acceptable intensity of 100 mW/cm$^2$ (at 10 second exposure). The beam size at the lens is nearly 5 cm, so the maximum system power is now 1963 mW. This is about a factor of 16 larger than the implementation without the diffuser shown in FIG. 3A.

The laser source may be any of a number of laser sources, including, but not limited to, vertical-cavity surface-emitting lasers (VCSELs), VCSEL arrays, strip lasers, fiber lasers, or fiber coupled lasers with an additional amplification stage. One example of a fiber coupled laser may be a telecom laser in the C band that is connected to an EDFA (erbium doped fiber amplifier) and the fiber output of the EDFA is then connected to the transmitter. The size of the laser source may range from as small as 5 microns, for a visible wavelength fiber up to 10 millimeters, for a large VCSEL array. Some other examples include a 1 mm VCSEL array, a 9-micron core, single mode telecom fiber and a 100-micron multi-mode fiber. The laser wavelength may be any value that can be physically realized including UV, visible, near infrared, far infrared and others. Common wavelengths already available that may be used in these implementations include 800 nm, 850 nm, 905 nm, 1300 nm, the telecom C band, and the telecom L band.

For some example systems, diffusers from Brightview Technologies may be used. In one implementation, the spot product uses the C-HE40-PE-S-M-RA12 which increases the +/−12° divergence of the VCSEL array to about +/−27°. In this implementation the diffuser sits ~7 mm from the laser. There is a limit to how close the diffuser can be. If it is too close to the laser, the small amount of absorption will heat the diffuser up and may melt it. Additionally, the further away the diffuser sits, the larger α can be because the spot size on the diffuser increase with increasing distance between the laser and the diffuser. The efficiency of this diffuser is quite high, ranging from 89% up to 97%. The degree of divergence can be engineered by selection of the particular diffuser. Brightview has standard products ranging from ~5° up to 127° (FWHM) and custom diffusers can hit any target in that range.

Other diffusers may range from 1 degree up to 2 pi steradians.

Note that this scheme may only work in a highly diverged beam system, because the divergence introduced by the diffuser is well beyond the acceptable beam divergence for a collimated FSO system. That is, the system may have too large an angular range and may not have enough laser power to achieve any distance. This works in with diverged beam disclosures precisely because the beam is already diverged and the 25 to 200 mrad of divergence is within the design range of overall system divergence, which has ranged from 0.1° (1.75 mrad) to 20° (349 mrad) or more up a hemisphere or 2 pi steradians.

Note that the divergences (including laser emission, intrinsic, and overall) may have different values in different directions. This may be due to the design of the laser, for example strip lasers typically have a larger horizontal divergence as compared to their vertical divergence. It may be intentionally designed, for example it may be beneficial to have a transmitter with a larger horizontal divergence than vertical for use in broadcast configurations where one transmitter broadcasts to multiple receivers near the ground.

The intrinsic divergence and the overall divergence can be independently controlled with the requirement that the overall divergence is larger than the intrinsic divergence. The intrinsic divergence is set by the ratio of the spot size on the diffuser to the distance from the diffuser to the lens. The overall divergence can be changed by moving the lens from focus (where the overall divergence is equal to the intrinsic divergence) closer to the diffuser, thereby increasing the overall divergence. This will have an impact on the intrinsic divergence but it will be small compared to the change in overall divergence as the lens is moved.

Figure 4:
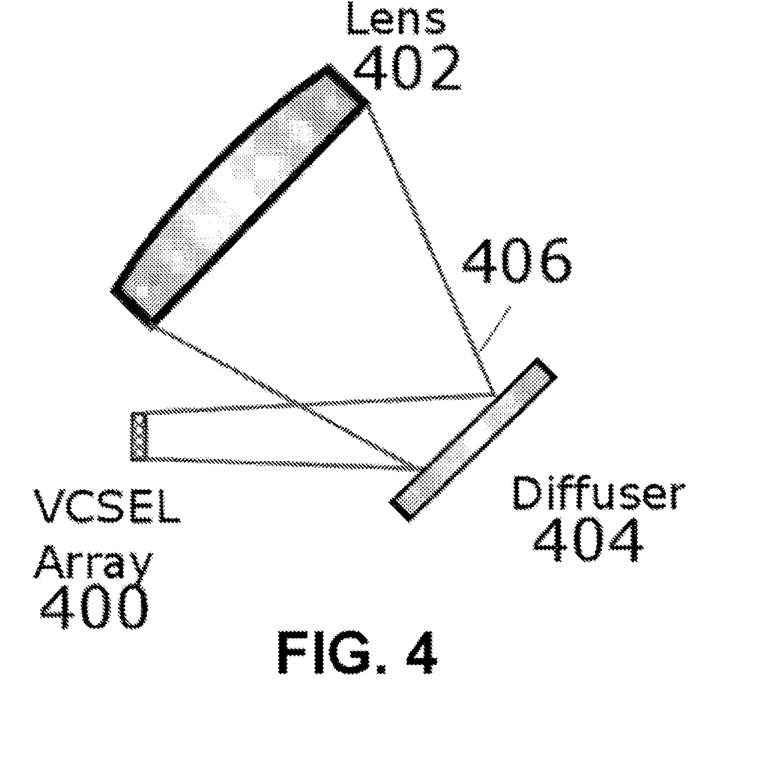
FIG. 4 shows diverged beam optical transmitter with a diffuser in a reflective configuration, according to some example implementations.

Example implementations may also be used in a reflective configuration where the laser points at the front of the diffuser and laser light then reflects and scatters off of the diffuser to increase the divergence angle. FIG. 4 shows an example implementation of this configuration. The beam from the laser array 400 hits the diffuser 404, and is reflected 406 before hitting the lens 402. Again the final beam divergence may range from 0.1 degree up to 20 degrees up to 2 pi steradians.

A further advantage of example implementations of the present disclosure is that shorter focal length lenses can be used, particularly for the transmitter. This may decrease the overall system size. For example, to fill a 5 cm lens with a light diverging from the laser at +/−12° takes a focal length of ~12 cm to nearly fill the lens. With a diffuser increasing that angle to +/−25°, the same spot size on the 5 cm lens may be achieved in ~6 cm focal length, thus reducing the distance between the laser and the lens and potentially reducing the size of the system.

The diffuser may be a passive or active element. One example implementation uses a passive engineered diffuser from Brightview Technologies. Other passive diffusers can be used including ground glass and others. Active elements could be used for the diffusers in this description as well. These include elements that change some relevant optical property via a change in a voltage, a current, a mechanical strain or stress, or some other property. The active element(s) may be used to adjust the beam divergence based on various scenarios or feedback loops. In a fog scenario, for example, the intrinsic beam divergence may be decreased in order to increase the amount of light that detected by the receiver.

Figure 5A:
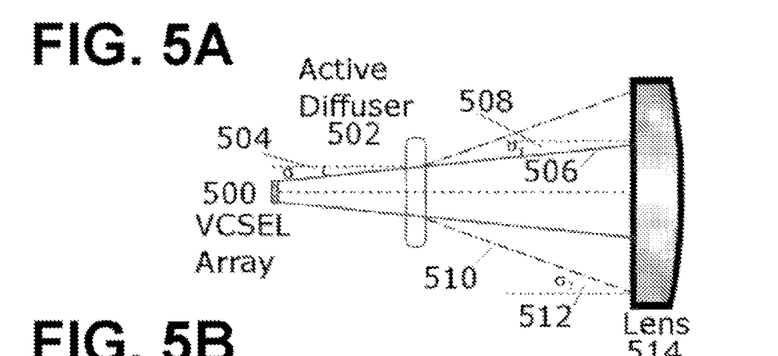
FIG. 5A shows diverged beam optical transmitter with an active diffuser, according to some example implementations.

FIG. 5A shows an implementation. Here, the laser array 500 emits light that makes an angle σ 504 with the active diffuser 502. The diffuser 502 may scatter light in any angle ranging from none 506 which makes an angle $\sigma_1$ 508 with the lens to a maximum beam 510 making an angle $\sigma_2$ 512. Note that $\sigma_1$ 508 is equal to σ 504.

In another scenario, a very wide divergence may be used for link acquisition and once the transceivers are pointed toward each other, the divergence may be decreased. Data rate may be changed with divergence, for example a very low data rate is used with a very wide divergence for link acquisition and then when the transceivers are aligned, the divergence can be decreased and the data rate increased. Receivers may use a similar effect to allow one detector to have a wide field of view with a very low data rate and then decrease the field of view and increase the data rate.

Figure 5B:
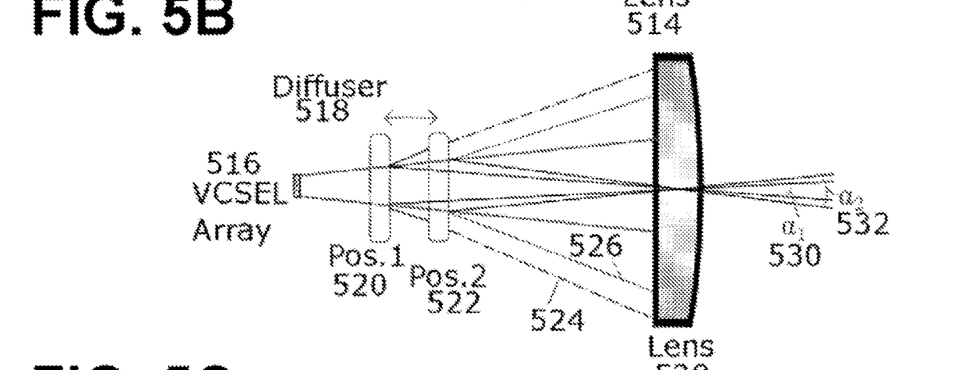
FIG. 5B shows diverged beam optical transmitter with a diffuser that may be physically moved relative to the source and the lens to change the overall beam divergence, according to some example implementations.

In some implementations, the diffuser may be physically moved relative to the source and the lens to change the overall beam divergence. FIG. 5B shows an implementation. Here, the laser array 516 emits light that hits a diffuser 518 in one of two positions (position 1 520 or position 2 522). The diffracted rays from the diffuser in position 1 520 are shown by the dot-dashed line 524. If the diffuser is further away from the source in position 2 522, the rays are given by the solid line 526. Each of these positions has an associated α with it as well. For position 1 520 α is given by $\alpha_1$ 530 in the figure while for position 2 522, α is given by $\alpha_2$ 532. Although this figure only depicts two positions, there are an infinite number of positions over a given range that the diffusers may occupy that will each fill a different extent of the lens and have a different associated α.

Figure 5C:
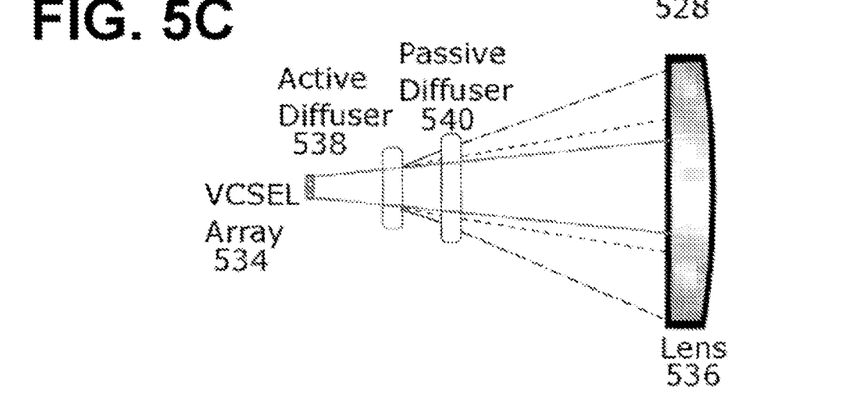
FIG. 5C shows diverged beam optical transmitter with both an active diffuser and a passive diffuser, according to some example implementations.

In some implementations, there may be both an active diffuser and a passive diffuser. If the active diffuser is closer to the laser (array) source, it can control the intrinsic divergence by controlling the spot size on the second, static, diffuser. The static diffuser and lens then control the overall divergence. This is shown in FIG. 5C. A laser array 534 emits light that hits an active diffuser 538. The active diffuser controls the intrinsic divergence of the light by dictating how much of the passive diffuser 540, the beam fills. The passive diffuser 540 and lens 536 then control the overall divergence and thus the power density. As previously discussed, both of these quantities are important in eye safety. Alternately, the passive diffuser can be closer to the light source and the active diffuser can be after the passive diffuser, but still before the lens.

Note that anywhere a lens is described, the system may use one or more lenses or mirrors to achieve the desired effect. Lenses may be spherical, parabolic, aspheres, achromats, or other types.

Likewise, on the receive end there is an acceptance angle for the receiver. This is approximately set by the size of the detector divided by the focal length of the receive lens. The receive acceptance angle may take on any value from a microradian up to 2 pi steradians. In some implementation the acceptance angle may be larger than 1.7 mrad. In some implementations, it is within a few milliradians of the source divergence angle. In other cases, the receive acceptance angle is larger than the laser divergence angle; is may help with aligning the two endpoints of the link with each other. In some cases, the receive acceptance angle may be smaller than the transmitter divergence angle; this may increase the overall link distance or may insure that if a receiver is aligned with the transmitter on the other end of the link, then the transmitter on this end is also aligned with the receiver on the other end of the link.

Figure 6:
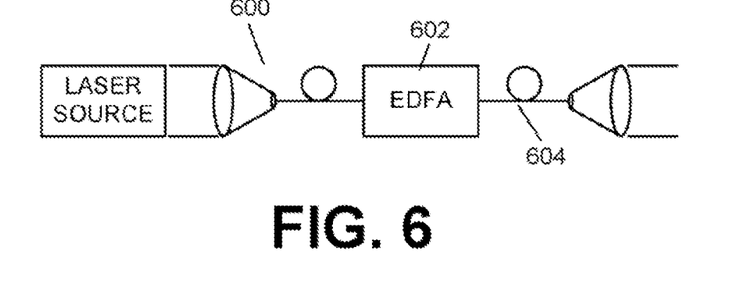
FIG. 6 shows an example in which a laser source includes a fiber coupled laser, according to some example implementations.

As described above, the laser source may be any of a number of laser sources, including, but not limited to, VCSELs, VCSEL arrays, strip lasers, fiber lasers, or fiber coupled lasers with an additional amplification stage. FIG. 6 shows an example in which the laser source includes a fiber coupled laser 600 that is amplified by an EDFA 602 and then connected to the diverged beam optical transmitter by another fiber 604.

Figure 7:
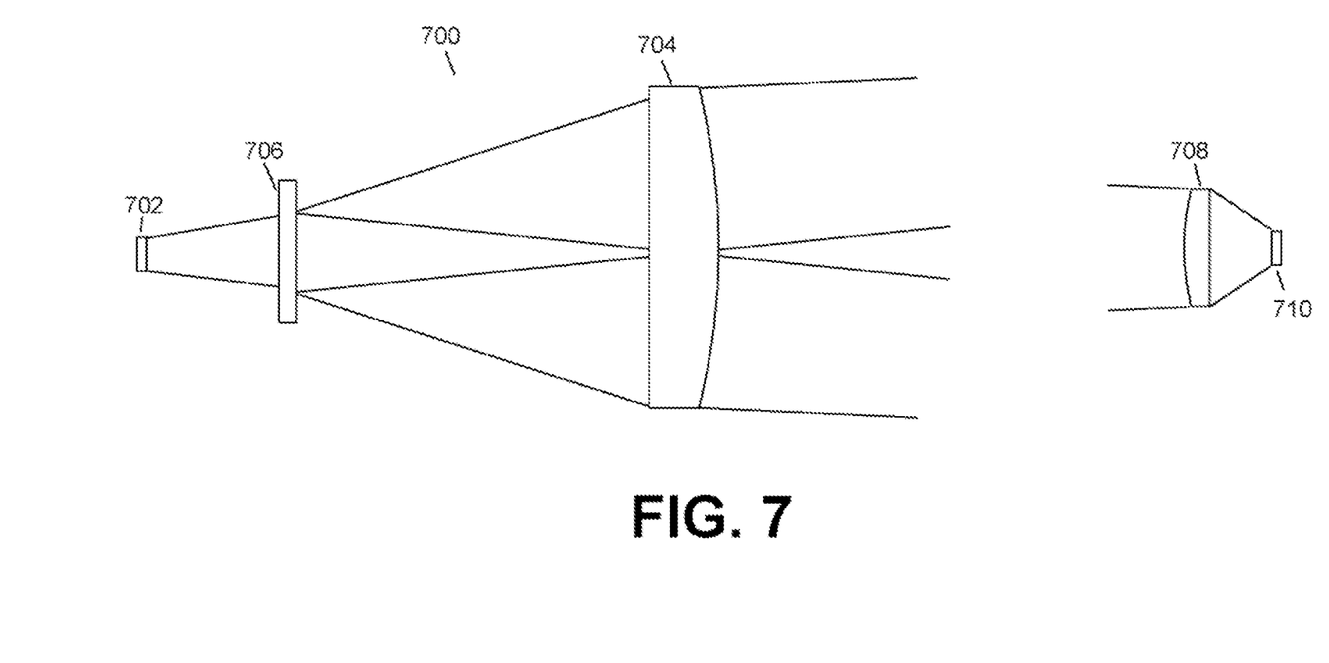
FIG. 7 shows a diverged beam optical communications system, according to some example implementations.

FIG. 7 shows a diverged beam optical communications system 700, according to some example implementations. The system includes a laser source 702 configured to emit a light beam, and one or more lenses 704 configured to collimate the light beam to an overall divergence of the light beam. The system includes a diffuser 706 configured to increase an intrinsic divergence of the light beam and to fill some portion of the one or more lenses such that the light beam is eye safe after the one or more lenses.

As also shown, the system 700 includes a receive lens 708 configured to focus the light beam onto a detector 710. In some examples, the detector has an etendue sufficient to receive light from the receive lens with an acceptance angle larger than 1.7 mrad. In other examples, the detector has a etendue sufficient to receive light from the receive lens with an acceptance angle larger than 5 mrad. And in yet other examples, the detector has a etendue sufficient to receive the light beam from the receive lens with an acceptance angle larger than 17 mrad.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A diverged beam optical transmitter comprising:
   a laser source configured to emit a light beam;
   one or more lenses;
   a diffuser placed between the laser source and the one or more lenses, and configured to increase an intrinsic divergence of the light beam and to fill some portion of the one or more lenses such that the light beam is eye safe after the one or more lenses, wherein the diffuser is an active element configured to change a degree of diffusion in response to an input, and
   one or both of:
      (i) an additional passive diffuser between the active diffuser and the one or more lenses, and
      (ii) wherein the active element is a mechanically movable element that substantially prevents transmission of light in its resting position.

2. The diverged beam optical transmitter of claim 1, wherein the intrinsic divergence of the light beam has different values in different directions.

3. The diverged beam optical transmitter of claim 1, wherein the laser source includes a vertical-cavity surface-emitting laser array.

4. The diverged beam optical transmitter of claim 1, wherein the laser source includes a fiber coupled laser that is amplified by an erbium doped fiber amplifier and then connected to the diverged beam optical transmitter by another fiber.

5. The diverged beam optical transmitter of claim 1, wherein the diffuser is a transmission diffuser.

6. The diverged beam optical transmitter of claim 1, wherein the diffuser is configured to be translated closer to or farther from the laser source to change the intrinsic divergence.

7. The diverged beam optical transmitter of claim 6, wherein the diffuser is configured to be translated closer to the laser source to increase the intrinsic divergence during link acquisition, and then farther from the laser source to decrease the intrinsic divergence and increase a rate of data transmission.

8. The diverged beam optical transmitter of claim 5, wherein the transmission diffuser is an engineered diffuser.

9. The diverged beam optical transmitter of claim 1, wherein the diverged beam optical transmitter is eye safe per Class 1.

10. The diverged beam optical transmitter of claim 1, wherein the diverged beam optical transmitter is eye safe per Class 1M.

11. A diverged beam optical communications system comprising:
    a laser source configured to emit a light beam;
    one or more lenses configured to collimate the light beam to an overall divergence of the light beam;
    a diffuser configured to increase an intrinsic divergence of the light beam and to fill some portion of the one or more lenses such that the light beam is eye safe after the one or more lenses, wherein the diffuser is an active element configured to change a degree of diffusion in response to an input;
    a receive lens;
    a detector, the receive lens configured to focus the light beam onto the detector, and the detector with an etendue sufficient to receive light from the receive lens with an acceptance angle larger than 1.7 mrad, and
    one or both of:
       (i) an additional passive diffuser between the active diffuser and the one or more lenses, and
       (ii) wherein the active element is a mechanically movable element that substantially prevents transmission of light in its resting position.

12. The diverged beam optical communications system of claim 11, wherein the intrinsic divergence of the light beam has different values in different directions.

13. A diverged beam optical communications system comprising:
    a laser source configured to emit a light beam;
    one or more lenses configured to collimate the light beam to an overall divergence of the light beam;
    a diffuser configured to increase an intrinsic divergence of the light beam and to fill some portion of the one or more lenses such that the light beam is eye safe after the one or more lenses, wherein the diffuser is an active element configured to change a degree of diffusion in response to an input;
    a receive lens; and
    a detector, the receive lens configured to focus the light beam onto the detector, and the detector with a etendue sufficient to receive light from the receive lens with an acceptance angle larger than 5 mrad, and
    one or both of:
       (i) an additional passive diffuser between the active diffuser and the one or more lenses, and
       (ii) wherein the active element is a mechanically movable element that substantially prevents transmission of light in its resting position.

14. The diverged beam optical communications system of claim 13, wherein the intrinsic divergence of the light beam has different values in different directions.

15. A diverged beam optical communications system comprising:
    a laser source configured to emit a light beam;
    one or more lenses configured to collimate the light beam to an overall divergence of the light beam;
    a diffuser configured to increase an intrinsic divergence of the light beam and to fill some portion of the one or more lenses such that the light beam is eye safe after the one or more lenses, wherein the diffuser is an active element configured to change a degree of diffusion in response to an input;

a receive lens; and a detector, the receive lens configured to focus the light beam onto the detector, and the detector with a etendue sufficient to receive the light beam from the receive lens with an acceptance angle larger than 17 mrad, and one or both of:
  (i) an additional passive diffuser between the active diffuser and the one or more lenses, and
  (ii) wherein the active element is a mechanically movable element that substantially prevents transmission of light in its resting position.

16. The diverged beam optical communications system of claim 15, wherein the intrinsic divergence of the light beam has different values in different directions.

17. The diverged beam optical communications system of claim 15, wherein the diffuser is configured to be translated closer to or farther from the laser source to change the intrinsic divergence.

\* \* \* \* \*

UNITED STATES PATENT AND TRADEMARK OFFICE
CERTIFICATE OF CORRECTION

| | | |
|---|---|---|
| PATENT NO. | : 11,973,538 B2 | Page 1 of 1 |
| APPLICATION NO. | : 17/760677 | |
| DATED | : April 30, 2024 | |
| INVENTOR(S) | : William J. Brown et al. | |

It is certified that error appears in the above-identified patent and that said Letters Patent is hereby corrected as shown below:

In the Specification

In Column 1, Lines 39-40, delete "that that" and insert -- that --

In Column 2, Line 27, delete "AND" and insert -- and --

In Column 8, Line 58, delete "cm2;" and insert -- $cm^2$; --

In Column 9, Line 67, delete "62" and insert -- $\sigma_2$ --

Signed and Sealed this
First Day of October, 2024

Katherine Kelly Vidal
*Director of the United States Patent and Trademark Office*